US012562479B2

(12) United States Patent
Liversidge et al.

(10) Patent No.: US 12,562,479 B2
(45) Date of Patent: Feb. 24, 2026

(54) HIGH BAND ANTENNA ELEMENTS AND A MULTI-BAND ANTENNA

(71) Applicant: Alpha Wireless Ltd., Portlaoise (IE)

(72) Inventors: Peter Liversidge, Glenbrook (AU); Shakil Bhuiyan, Mount Druit (AU)

(73) Assignee: Alpha Wireless Ltd., Ballybrittas (IE)

( * ) Notice: Subject to any disclaimer, the term of this patent is extended or adjusted under 35 U.S.C. 154(b) by 301 days.

(21) Appl. No.: 18/255,471

(22) PCT Filed: Dec. 10, 2021

(86) PCT No.: PCT/EP2021/085302
§ 371 (c)(1),
(2) Date: Jun. 1, 2023

(87) PCT Pub. No.: WO2022/123056
PCT Pub. Date: Jun. 16, 2022

(65) Prior Publication Data

US 2024/0021989 A1 Jan. 18, 2024

(30) Foreign Application Priority Data

Dec. 11, 2020 (GB) ...................................... 2019593

(51) Int. Cl.
*H01Q 5/335* (2015.01)
*H01Q 5/328* (2015.01)
*H01Q 5/48* (2015.01)

(52) U.S. Cl.
CPC ............. *H01Q 5/335* (2015.01); *H01Q 5/328* (2015.01); *H01Q 5/48* (2015.01)

(58) Field of Classification Search
CPC .......... H01Q 5/335; H01Q 5/328; H01Q 5/48; H01Q 1/521; H01Q 21/26; H01Q 1/246; H01Q 5/321
See application file for complete search history.

(56) References Cited

U.S. PATENT DOCUMENTS 3,786,372 A * 1/1974 Epis .......................... H01P 5/10
333/33
6,147,647 A * 11/2000 Tassoudji ............... H01Q 21/28
333/219.1

(Continued)

FOREIGN PATENT DOCUMENTS

CN 110635229 A 12/2019
GB 2416246 A * 1/2006 ............. H01Q 21/24

(Continued)

*Primary Examiner* — Dameon E Levi
*Assistant Examiner* — Jordan E. DeWitt
(74) *Attorney, Agent, or Firm* — Scale LLP

(57) ABSTRACT

Antenna elements for multiband antennas are disclosed. A multiband antenna is configured to operate in at least two frequency bands. The antenna element is configured to receive a signal from an unbalanced signal feed and comprises: a stalk configured to be mounted on a ground plane; at least one radiating element extending from the stalk; a balun configured to receive and convert an unbalanced signal from an unbalanced signal feed to a balanced signal and to supply the balanced signal to the at least one radiating element; and at least one resonance suppression filter. The at least one resonance suppression filter comprises an inductive component and a capacitive component arranged in parallel, and in some embodiments a resistive component in series with the inductive component.

20 Claims, 16 Drawing Sheets

(56) References Cited

U.S. PATENT DOCUMENTS

| | | | | |
|---|---|---|---|---|
| 9,698,486 | B2 * | 7/2017 | Shooshtari | H01Q 1/521 |
| 9,711,871 | B2 * | 7/2017 | Jones | H01Q 21/28 |
| 10,263,327 | B1 | 4/2019 | Zou et al. | |
| 11,088,460 | B2 * | 8/2021 | Sanjuan Flores | H01Q 5/307 |
| 11,233,330 | B2 * | 1/2022 | Clauzier | H01Q 9/30 |
| 2004/0207559 | A1 * | 10/2004 | Milosavljevic | H01Q 9/0442 343/702 |
| 2005/0270238 | A1 * | 12/2005 | Jo | H01Q 9/40 343/702 |
| 2006/0038721 | A1 * | 2/2006 | Ozkar | H01Q 9/0421 343/702 |
| 2007/0069956 | A1 * | 3/2007 | Ozkar | H01Q 9/0442 343/702 |
| 2009/0115670 | A1 * | 5/2009 | Nysen | H01Q 5/364 343/702 |
| 2009/0115673 | A1 * | 5/2009 | Nysen | H04B 7/04 343/730 |
| 2009/0213020 | A1 * | 8/2009 | Rentz | H01Q 21/30 343/722 |
| 2011/0140982 | A1 | 6/2011 | Ozden et al. | |
| 2012/0229360 | A1 * | 9/2012 | Jagielski | H01Q 9/30 343/860 |
| 2014/0118196 | A1 * | 5/2014 | Koskiniemi | H01Q 21/205 343/702 |
| 2014/0159982 | A1 * | 6/2014 | De Luis | H01Q 9/42 343/843 |
| 2015/0002359 | A1 * | 1/2015 | Dong | H01Q 1/48 343/853 |
| 2015/0054699 | A1 * | 2/2015 | Ali | H01Q 9/42 343/749 |
| 2015/0070234 | A1 * | 3/2015 | Jones | H01Q 21/28 343/797 |
| 2017/0264018 | A1 * | 9/2017 | Hu | H01Q 1/242 |
| 2018/0026338 | A1 * | 1/2018 | Lin | H01Q 5/35 343/702 |
| 2019/0157740 | A1 * | 5/2019 | Shen | H04B 1/0475 |
| 2020/0099130 | A1 * | 3/2020 | Daojian | H01Q 1/48 |
| 2020/0127389 | A1 * | 4/2020 | Li | H01Q 25/001 |
| 2020/0127605 | A1 * | 4/2020 | Vida | H03H 7/38 |
| 2021/0098894 | A1 * | 4/2021 | Haviv | H01Q 21/062 |
| 2021/0305684 | A1 * | 9/2021 | Hou | H01Q 1/246 |
| 2021/0328365 | A1 * | 10/2021 | Zhang | H01Q 21/065 |
| 2023/0141980 | A1 * | 5/2023 | Tsai | H01Q 5/378 343/893 |
| 2024/0021989 | A1 * | 1/2024 | Liversidge | H01Q 1/521 |
| 2024/0072405 | A1 * | 2/2024 | Gunnarsson | H01P 5/12 |
| 2025/0167461 | A1 * | 5/2025 | Ould-Mohamed | H01Q 9/045 |

FOREIGN PATENT DOCUMENTS

| | | | |
|---|---|---|---|
| WO | 2009155984 | A1 | 12/2009 |
| WO | 2020135524 | A1 | 7/2020 |

* cited by examiner

HIGH BAND ANTENNA ELEMENTS AND A MULTI-BAND ANTENNA

RELATED APPLICATIONS

This is a national stage application of International Application No. PCT/EP2021/085302, filed Dec. 10, 2021, which claims priority to U.K. Patent Application No. 2019593.9, filed Dec. 11, 2020. The foregoing applications are incorporated by reference herein in their entireties.

FIELD OF THE INVENTION

The field of the invention relates to high band antenna elements and to multi band antennas incorporating such elements.

BACKGROUND

Multiband antennas are formed of multiple arrays of antenna elements at least some of which are configured to operate in different frequency bands. These antenna elements are arranged close to each other and will suffer from interband effects. In particular, the higher frequency band radiating elements that operate at the shorter wavelengths and resonate at a half wavelength at these frequencies may resonate at a quarter wavelength at the lower frequencies, in particular where the antenna elements are dipoles.

FIG. 1A shows an example arrangement of a multiband antenna where there is a low frequency larger element array surrounded by one or more higher frequency arrays. In such an arrangement, it is important to suppress unwanted resonances in the higher band elements at the lower band frequency. These resonances may be of the "common mode" type, where the whole high band element/radiator structure acts as a quarter-wave resonator at the low band frequency, and consequently resonates in the presence of the low band signal and disrupts the low band radiation pattern and other parameters such as coupling between polarisations.

It would be desirable to be able to reduce resonances in the higher band elements at the lower band frequency.

WO2020135524 discloses a resonant mode suppression filter that is placed between the ground plane and the balun but within the signal feed circuit. The aim is to supress common mode resonance of the high-frequency radiator without affecting the structure of the radiating arms or balun. However, placing the filter in the signal feed circuit affects the signal being fed to the antenna.

US2016/0285169 discloses a resonant mode suppression filter that is placed between the balun and the radiating elements. In this position, the filter is also directly in the signal feed circuit and consequently affects the signal being fed to the dipole at the high band frequency.

SUMMARY

A first aspect provides an antenna element for a multiband antenna, said multiband antenna configured to operate in at least two frequency bands, said antenna element being configured to resonate in a higher frequency band of said at least two frequency bands; said antenna element being configured to receive a signal from an unbalanced signal feed and comprising: a stalk mounted on an intermediate ground plane; at least one radiating element extending from said stalk; a balun mounted on said stalk and configured to receive and convert an unbalanced signal from an unbalanced signal feed to a balanced signal and to supply said balanced signal to said at least one radiating element; and at least one resonance suppression filter, said at least one resonance suppression filter comprising an inductive component and a capacitive component arranged in parallel, said at least one resonance suppression filter being configured to suppress signals in a frequency band that is lower than said higher frequency band; wherein said at least one resonance suppression filter is positioned to decouple said stalk from a ground plane at frequencies within said lower frequency band, said at least one resonance suppression filter being mounted such that said intermediate ground plane is coupled to said ground plane at the higher frequency band and is decoupled from said ground plane at the lower frequency band.

Multiband antennas comprising antenna elements configured to resonate in different frequency bands can suffer from distortion of the radiation patterns from resonances in one frequency band that develop in radiating elements designed to radiate in a different frequency band. In particular, lower frequency band radiating elements may have their radiation patterns distorted by resonances that develop in radiating elements designed to radiate at a higher frequency band. Typically, the higher frequency band may be two to three times higher in frequency. Where, for example, the radiating element is a dipole, the dipole and supporting structure may resonate as a quarter-wavelength resonator at the lower frequency, and the lower frequency resonance may cause distortions in the lower frequency radiation pattern. Embodiments seek to suppress such undesirable resonances by decoupling the ground plane from the stalk at the lower frequencies thereby inhibiting the lower frequency quarter-wavelength mode resonance which may require the stalk to be coupled to the ground plane.

In some embodiments the resonance suppression filter is a common mode suppression filter and impedes the stalk and radiating element acting as a quarter-wavelength resonator. This resonance occurs where the radiating structure resonates as if it were a one quarter wavelength of the low band frequency. This may occur where the radiating element is a dipole and one dipole arm and the connected stalk act as a quarter-wavelength resonator. A quarter-wavelength resonator is a resonant structure that is open-circuit or free to vibrate at one end, and short-circuit at the other, or fixed in place. Embodiments seek to supress such undesirable resonances by decoupling the ground plane from the stalk at the lower frequencies thereby inhibiting the lower frequency quarter-wavelength resonance which requires the stalk to be coupled to the ground plane at frequencies within the lower frequency band and thereby impede the resonance characteristics of the antenna element as it is not directly coupled to ground at these frequencies.

Embodiments achieve decoupling of the high band dipole stalk from the ground plane by providing an intermediate ground plane and mounting the stalk on this. This is then decoupled from the main ground plane at the low band frequency by the resonance suppression filter. The capacitor of the resonance suppression filter maintains low impedance between the main ground plane and intermediate ground plane at high band frequencies, providing proper grounding of the dipole structure at high band frequencies.

In effect the resonance suppression filter acts as a band stop filter in the band of interest, in this case the band of interest is the lower frequency band of the multiband antenna. The band stop resonance suppression filter could be viewed as tuning the quarter wave resonator of the antenna outside of the band of interest, since it passes frequencies on either side of the stop band of the filter, and thereby enables a lower and higher frequency quarter-wave resonance on either side of the band of interest, while impeding resonance within the band.

The frequency of the lower and upper resonant frequencies introduced by the band stop filter depend on the natural frequency of resonance of the high band dipole without the filter in combination with the inductive component of the band stop filter for the lower resonance, and the capacitive component of the band stop filter for the upper resonance. Tuning the filter to place the lower end resonance just outside of the band of interest can provide an improvement to the radiation pattern of the low band dipole, in particular a reduced beamwidth at the lower end of the band of interest, which is often desirable. For example, where the lower frequency band of interest in the multiband antenna is 698-960 MHz, tuning the lower common mode resonance to approximately 600 MHz can provide a narrower beamwidth of the antenna radiation pattern in the lower part of the band of interest. Tuning of the lower resonant frequency is achieved by varying the inductance of the inductive component of the common mode suppression band stop filter.

In some embodiments, said intermediate ground plane comprises a baseboard.

In some embodiments, said resonance suppression filter is positioned between said intermediate ground plane and said ground plane.

In some embodiments, said antenna element comprises a high band signal circuit comprising a high band signal feed element, said balun and said balanced signal feed, said resonance suppression filter being outside of said high band signal circuit.

Having a configuration where the resonance suppression filter is outside of the high band signal feed circuit reduces the effect of the filter on the feed signal and provides an improved antenna element. In effect the tuning of the resonance suppression filter to provide the desired filtering of low band signals can be done without unduly affecting the matching network of the antenna element at its own frequency band of operation, providing greater flexibility in the design.

The resonance suppression filter provides a band stop function suppressing resonant frequencies within a band. The resonance suppression filter can be configured with a desired centre frequency and high edge and low edge of the band. Such control allows the low band resonances to be reduced in the lower frequency band of interest, leading to an improved signal and a decreased beamwidth in that band. The centre frequency of the band stop filter is within the lower frequency band of interest, and the high edge and low edge of the band stop filter are approximately equal to the high end and low end of the lower band of interest respectively. The parallel arrangement of the inductive and capacitive components in the band stop filter replace the natural common-mode quarter-wave resonant frequency of the antenna element with an upper and lower frequency pair of common-mode resonances in the antenna element structure. As described previously, the inductive and capacitive components of the filter can be tuned to place these lower and upper frequency common-mode resonances out of the lower band frequency of interest. The placement of these frequencies can be used advantageously to reduce the beamwidth of the antenna in the lower frequency band of interest. For a lower passband of interest of 698-960 MHz, for example, the lower and upper common-mode resonance frequencies can be tuned to approximately 600 MHz and 1000 MHz respectively to provide good beamwidth performance in the lower frequency band of interest.

In some embodiments, said resonance suppression filter is configured to form a band stop filter, said band stop filter being configured such that a high edge and low edge of said band stop filter are within 10% of said lower frequency band and a quarter wave resonance of said antenna element is below said lower edge of said band stop filter and lose to said lower edge of said band stop filter, within 15 preferably within 15%.

In some embodiments, said high band signal feed element comprises a coaxial cable, said coaxial cable comprising an inner conductor and outer conductor, said outer conductor of said coaxial cable connecting to said intermediate ground plane.

One effective way of providing an intermediate ground plane and a direct signal feed is to use a coaxial cable and connect the intermediate ground plane to the outer conductor of the cable and the inner feed conductor to the signal feed. The common-mode suppression filter is placed between the intermediate ground plane and the main antenna ground plane. In this way the filter is not in the direct signal feed path and the return path can be via the intermediate ground plane to the outer conductor of the coaxial cable.

In some embodiments, said outer conductor of said coaxial cable forms at least a portion of said inductive component of said resonance suppression filter.

In some embodiments, said coaxial cable is configured to lie on an opposite side of said ground plane and intermediate ground plane to said stalk, such that said coaxial cable is shielded from said at least one radiating element.

Extending the coaxial cable up to the stalk on the opposite side of the intermediate ground plane and coupling the inner conductor to the signal feed at a base of the stalk allows the ground plane to provide shielding of the coaxial cable up to the feed point at the base of the stalk.

In some embodiments, said capacitive component of said resonance suppression filter comprises a gap between said intermediate ground plane and said ground plane.

A compact and well shielded configuration is where the capacitive component of the resonance suppression filter is formed as a gap between the ground plane and intermediate ground plane. This allows the ground planes to be formed in a single layer and in some cases from a single layer of a printed circuit board.

In some embodiments, said balun comprises: a feed node configured to receive said unbalanced signal; and a balancing component extending from said feed node to said intermediate ground plane. The stalk comprises the balun and a balanced signal feed component extending from said feed point to said radiating element arm.

A second aspect provides an antenna element for a multiband antenna, said multiband antenna configured to operate in at least two frequency bands, said antenna element being configured to resonate in a higher frequency band of said at least two frequency bands; said antenna element being configured to receive a signal from an unbalanced signal feed and comprising: a stalk configured to be mounted on a ground plane; at least one radiating element extending from said stalk; a balun configured to receive and convert an unbalanced signal from said unbalanced signal feed to a balanced signal feed and to supply said balanced signal to said at least one radiating element; and at least one resonance suppression filter, said at least one resonance suppression filter comprising an inductive component and with a capacitive component arranged in parallel with said series arranged inductive component, said at least one resonance suppression filter being configured to suppress signals in a lower frequency band than said higher frequency band;

wherein said stalk comprises said balun and said at least one resonance suppression filter is within said balun.

The above describes a further arrangement where undesirable resonances are suppressed by decoupling the ground plane from the stalk at the lower frequencies thereby inhibiting the lower frequency quarter-wave resonance which requires the stalk to be coupled to the ground plane at frequencies within the lower frequency band and thereby impeding the quarter-wave resonant characteristics of the antenna element as it is not directly coupled to ground at these frequencies. Embodiments achieve this decoupling by mounting a resonance suppression filter on the balun.

Where the resonance suppression filter is mounted within the balun then it may be within the balancing component extending from the balun feed point to ground thereby decoupling the stalk from the ground plane in the lower frequency band.

The balun that converts the unbalanced feed signal to a balanced feed signal is located on the stalk, and in some embodiments comprises a signal feed component and a grounded balancing component. The stalk comprises signal feed lines and grounded balancing components extending in either direction from the feed node, the portion extending between the feed node and base of the stalk being the balun.

In some embodiments, said stalk comprises said balun and said balanced signal feed component, said balun and said balanced signal feed component being formed on different layers of a printed circuit board.

In some embodiments, said capacitive component of said at least one resonance suppression filter is formed on one layer of said printed circuit board.

Where the stalk comprises a printed circuit board and the resonance suppression filter is mounted on the stalk then in some embodiments the capacitive component of the resonance suppression filter may be formed on one layer of the printed circuit board. This is an effective compact and low cost way of providing both a signal feed and a resonance suppression filter. In some embodiments it is formed on the layer of the printed circuit board containing the balancing grounded components of the balun, on the return signal feed path within the balun portion of the stalk.

In some embodiments, said balun comprises: a feed node configured to receive said unbalanced feed signal; and a balancing component extending from said feed node to said ground plane. The stalk comprises the balun and a balanced signal feed component extending from said feed point to said radiating element.

Although, the radiating element may have a number of forms, in some embodiments said at least one radiating element comprises at least one dipole.

In some embodiments, said at least one resonance suppression filter further comprises a resistive component in series with said inductive component.

A resistive component in series with an inductive component provides additional damping of the low frequency signal and provides an improved suppression of the low frequency signal.

As noted previously, a resonance suppression filter may be an effective way of suppressing lower resonance frequency within a higher frequency band antenna element. In some embodiments in addition to a capacitive and inductive component the resonance suppression filter is provided with a resistive component arranged in series with the inductive component. In some embodiments this may improve the performance of the resonance suppression filter and provide improved damping of the low frequency signal.

Although the resistive element may have different resistive values depending on the configuration, power output and frequency bands, the resistive element is generally more than 1Ω, preferably more than 5Ω and in many embodiments more than 10Ω.

In some embodiments, said at least one resonance suppression filter consists of a capacitive component arranged in parallel with an inductive component and a resistive component.

It may be that the resonance suppression filter has multiple capacitive, inductive and resistive components but in some embodiments, the resonance suppression filter has just one capacitive component arranged in parallel with one inductive component and one resistive component. These components provide good suppression by themselves such that a filter may be formed exclusively of these components, leading to a low cost compact filter.

In some embodiments, said at least one resonance suppression filter is configured to suppress signals at a common mode resonant frequency of said antenna element.

Depending on the configuration of the antenna element, the lower frequency that is suppressed may be a common mode resonant frequency of the antenna element where it acts as a quarter-wave resonator. This is often the problematic frequency particularly for antenna elements with dipole arms resonant at the higher frequency where the dipole arms and stalk can act together as a quarter-wave resonator at a lower frequency.

A third aspect provides a multiband antenna configured to operate in at least two frequency bands, said multiband antenna comprising: a plurality of antenna elements configured to operate in a lower frequency band of said at least two frequency bands and a further plurality of antenna elements according to a first or second aspect; wherein said at least one resonance suppression filter is configured to suppress signals in said lower frequency band.

In some embodiments, a common mode of said further plurality of antenna elements is within said lower frequency band, said at least one resonance suppression filter being configured to suppress signals at said common mode frequency.

It should be noted that an antenna configured to operate in a frequency band may be configured to receive and/or transmit signals in that frequency band.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Figure 1A:
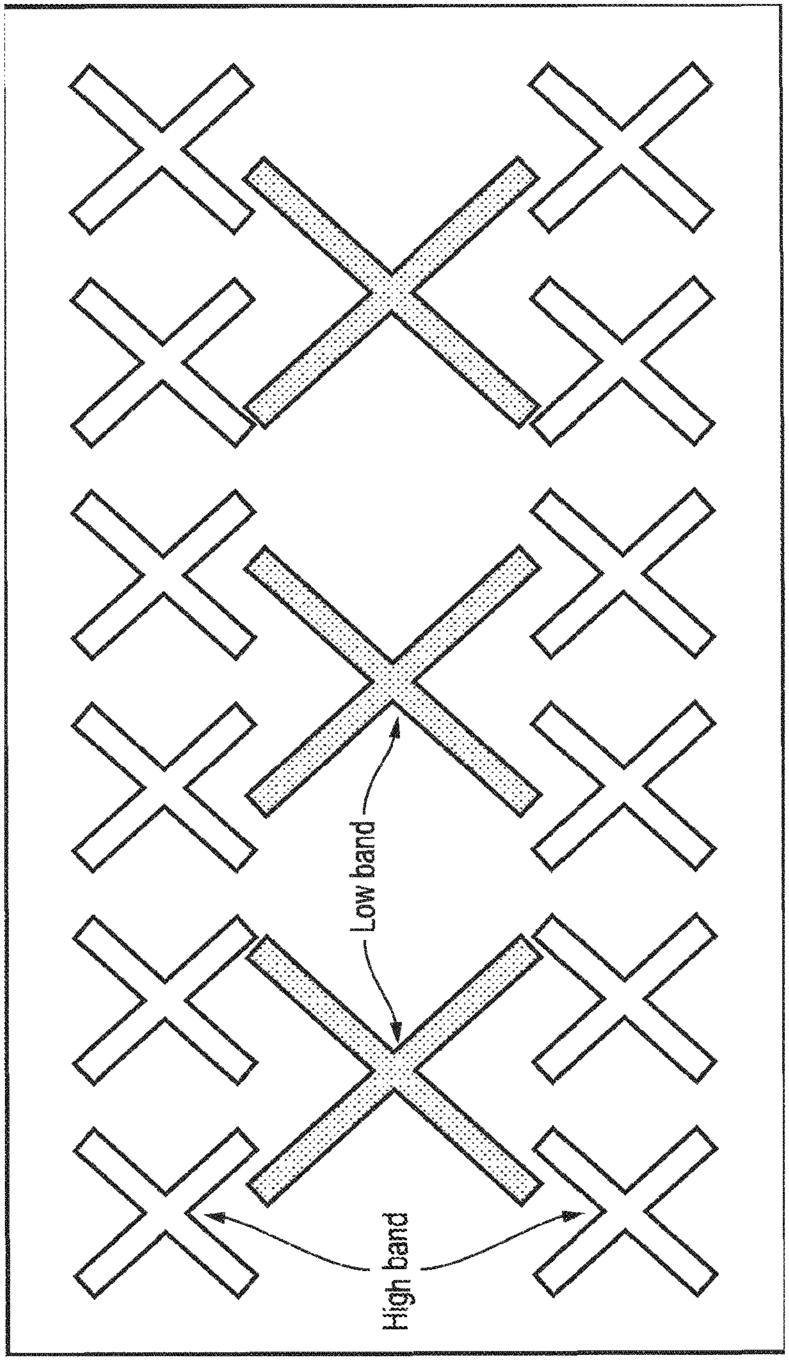
FIG. 1A schematically shows a typical arrangement of low band and high band radiator elements on a multiband antenna.
Figure 1B:
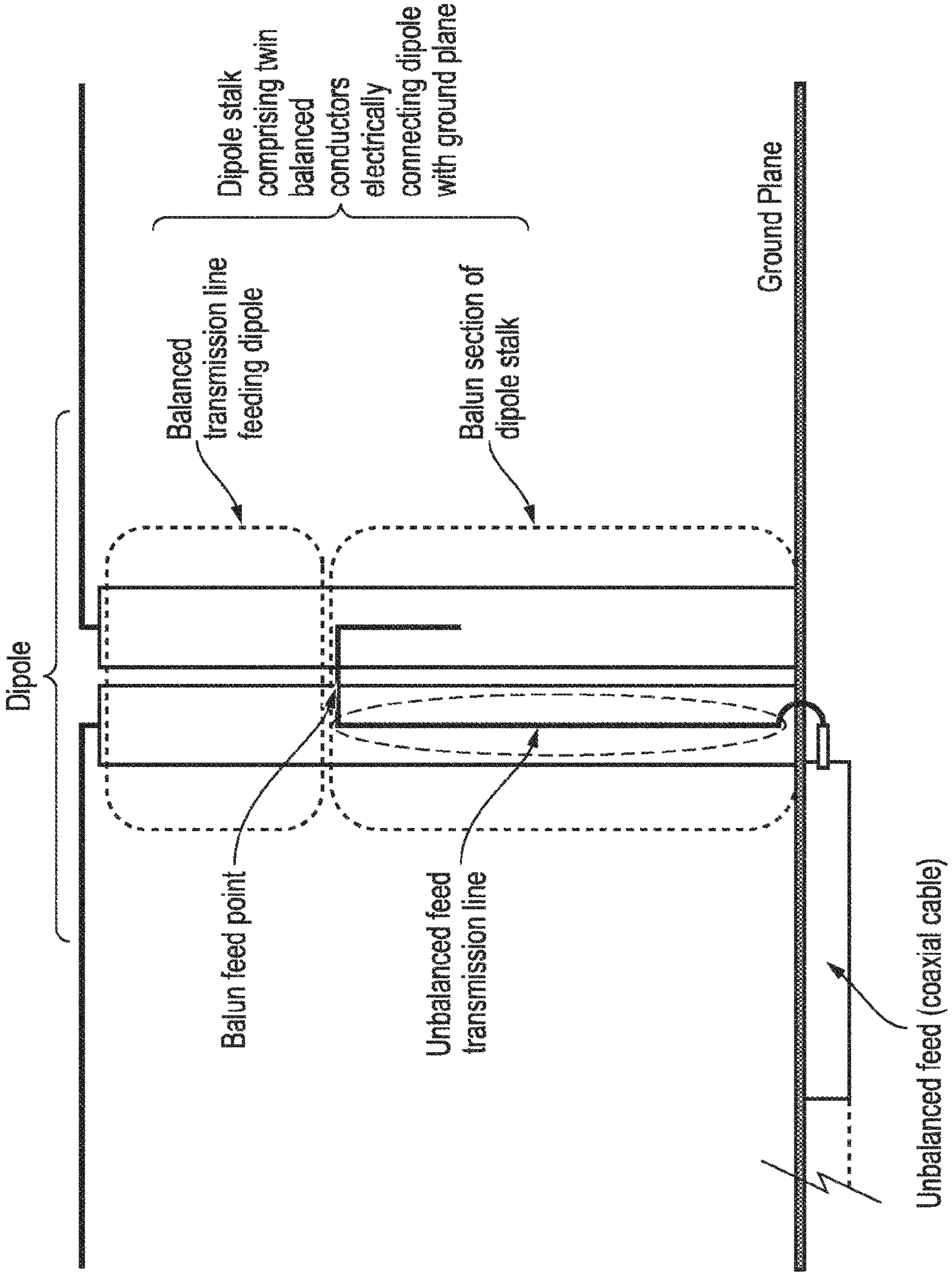
FIG. 1B schematically shows the different components of a high band antenna element.

FIG. 1B schematically shows the different elements of a high band antenna according to the prior art with the radiating elements in the form of the dipole arms, a stalk mounted on a ground plane and a feeding element in the form of a coaxial cable. The inner conductor of the coaxial cable is attached to a transmission line that feeds a balun feed point, the upper portion of the stalk comprises the balanced transmission line that feeds the dipole. The lower section comprises the balun section that provides the balancing of the feed line. The stalk comprises twin balanced conductors that electrically connect the dipole with the ground plane.

Embodiments provide an antenna element having a resonance suppression filter having in some embodiments, a capacitive component and an inductive component arranged in parallel and in other embodiments series mounted resistive and inductive components mounted in parallel with a capacitive component. This resonance suppression filter may be located either in the balun or associated with the baseboard. In still other embodiments the resonance suppression filter comprises a capacitive component arranged in parallel with series arranged capacitive, resistive and inductive components.

The antenna element comprises a higher frequency band radiating element for use in a multiband antenna. The multiband antenna comprising a low frequency band antenna array and at least one higher frequency band antenna array of radiating element antennas, that in some embodiments comprise:

- Radiating element arms that are resonant at the higher band and radiate the higher band signal;
- A radiating element "stalk" that supports the arms above a reflector. The stalk comprises an unbalanced feed line and balun that converts the unbalanced feed signal to a balanced configuration suitable for the radiating element arms;
- The antenna element may be configured to be mounted on a baseboard that capacitively couples the radiating element stalk to the reflector or ground plane, or in some embodiments the stalk of the antenna element may be mounted directly to the ground plane;
- One or more resonance suppression filters disposed in the balun, or on the baseboard.

A particular embodiment of the resonance suppression filter when included in the balun is the use of an "interdigital" capacitive component for the capacitive component in the filter. In this case, the capacitive component is arranged on one 2-dimensional surface.

In embodiments where the high band antenna element is configured to resonate at a half wavelength, such as where it comprises a dipole, then the resonance suppression filter acts as a common mode tuning circuit or common mode suppression filter to impede the antenna element from resonating in the common mode as a quarter-wave resonator at the lower frequency band.

Embodiments provide two approaches to implementing the resonance suppression filter on the high band radiating element.

A related example (see FIGS. 2A and 2B) breaks the radiating element arm in one place and replaces the broken link with a series capacitive component bypassed with a high-inductance component. The parallel combination of the capacitive component and inductance forms a filter tuned to block signal at the low band. There is a problem with putting the resonance suppression filter on the radiating element arm because its introduction upsets the impedance matching of the high band radiating element in its own frequency band, and this may be challenging to overcome. Basically, the resonance suppression filter detunes the radiating element by upsetting the resonant length of the radiating element arms, and in embodiments this is compensated for by adjusting the length of the radiating arms.

Although the resonance suppression filter may be just a capacitive and inductive component mounted in parallel in other embodiments the inductive component may have a resistive component in series with it, and in still other embodiments there may also be a capacitive component on this path.

One embodiment (see FIG. 3A to 3C) involves putting the resonance suppression filter 40A, 40B on the balun of the radiating element by breaking the balanced grounding component on both branches and inserting a capacitive component/inductive component in a similar way to having this on the radiating element arm. However, here the resonance suppression filter has less effect on the performance of the high band radiating element at its own frequency band than is the case in the examples of FIG. 2.

In the PCB implementation of the resonance suppression filter radiating element, it is convenient to create the capacitive component on a single layer of the PCB because the radiating element feed track is on the other side, so we provide an "interdigital capacitive component" which works by providing edge-capacitance over a winding edge length on a single layer. The ground layer for the feed track is broken to insert the capacitive component on the balun, which presents a problem for the feed track transmission line, but this can be overcome by careful tuning of the capacitive component. This is shown in FIG. 3C.

Another embodiment (see FIG. 4) comprises putting the resonance suppression filter associated with or on the baseboard of the antenna element between the stalk and the ground plane to decouple the antenna element from the ground plane at lower frequencies, the baseboard acting as an intermediate ground plane.

Figure 2A:
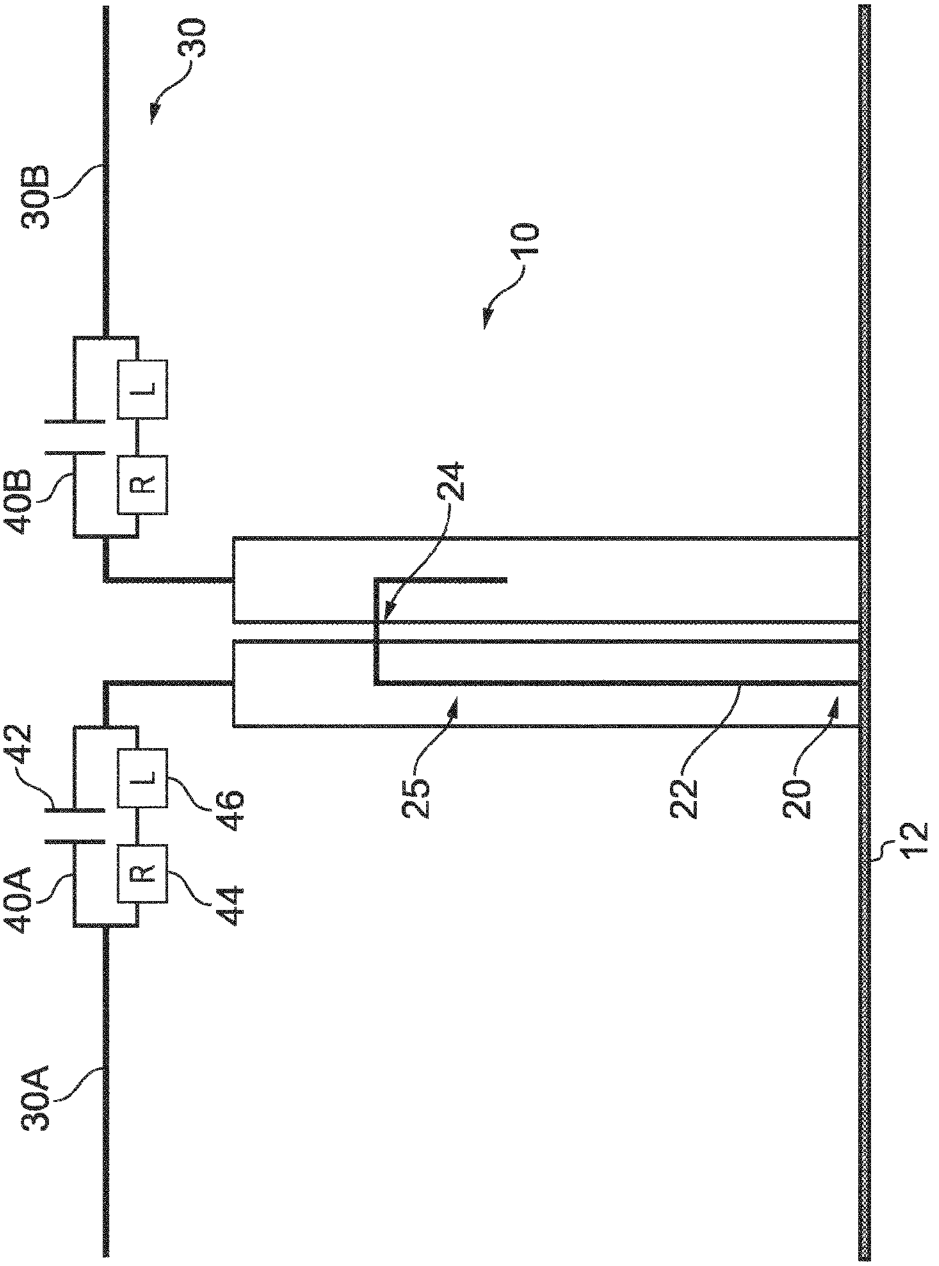
FIGS. 2A and 2B schematically show a high band antenna element according to a related example where the resonance suppression filter is in the radiating arm of the antenna element.

FIG. 2A schematically shows an antenna element 10 according to the related example comprising a ground plane 12 from which a stalk 20 extends. There is an unbalanced feed line 22 that extends up one side of the stalk and crosses to the other side of the stalk at a feed node 24. This forms part of the balun 25 which acts to convert the unbalanced feed to a balanced feed. The cross over point from the unbalanced feed line 22 acts as a feed node 24 from which the balanced transmission feed extends towards the dipole arms 30A and 30B on either side of the stalk. In this example there are two resonance suppression filters 40A and 40B one on each arm 30A, 30B of the dipole 30. The resonance suppression filters 40A and 40B in this example comprise a capacitive element 42, an inductive element 46 and a resistive element 44. The resistive element is optional but may improve performance by providing additional damping of the low frequency signal.

Figure 2B:
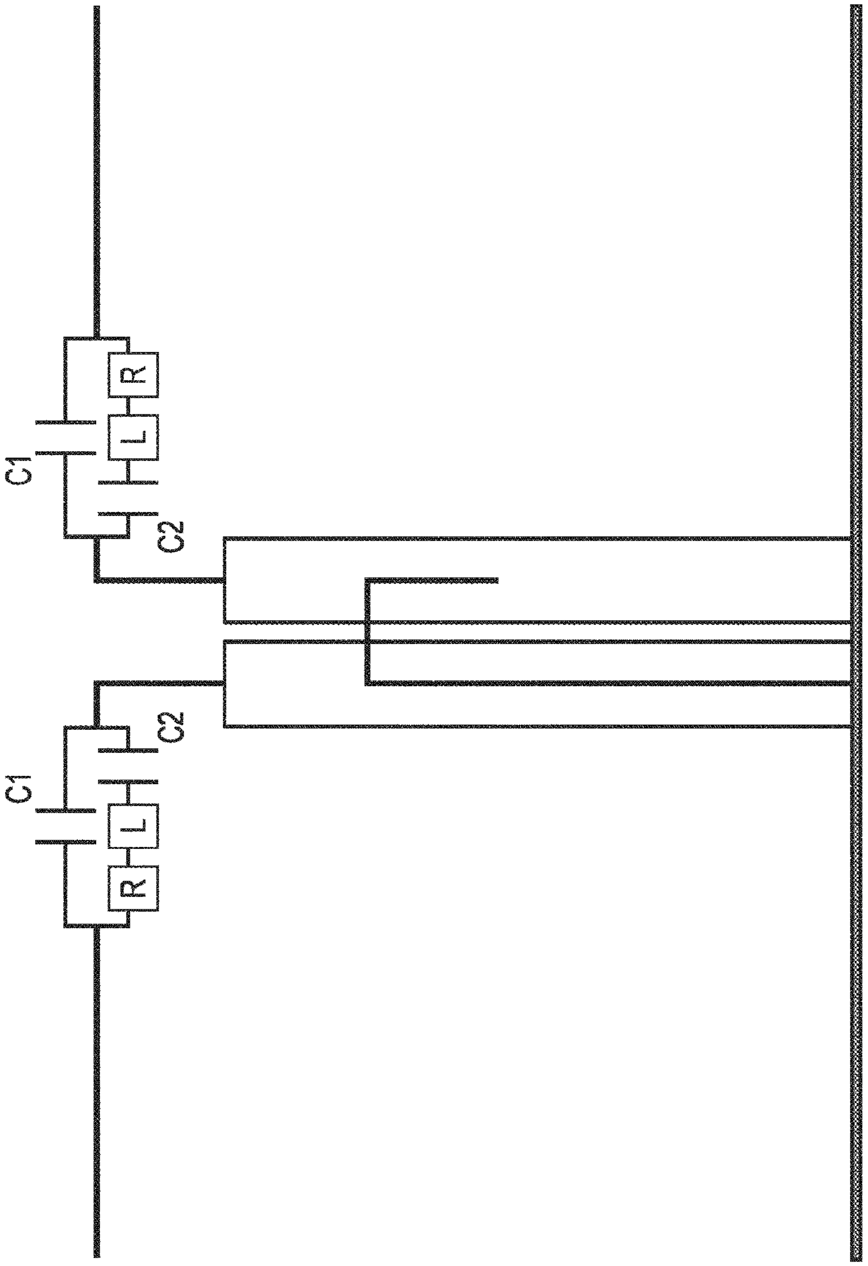

In the example shown in FIG. 2B there is an additional optional capacitive element C2 which is arranged in series with the resistive and inductive elements and in parallel with the other capacitive element C1.

There are challenges with putting the resonance suppression filter on the dipole arms because its introduction upsets the impedance matching of the high band dipole in its own frequency band and upsets its resonance frequency by upsetting the tuned length of dipole arms. Thus, in these examples the dipole arms 30A, 30B are adjusted in length to compensate for the presence of filters 40A and 40B.

Figure 3A:
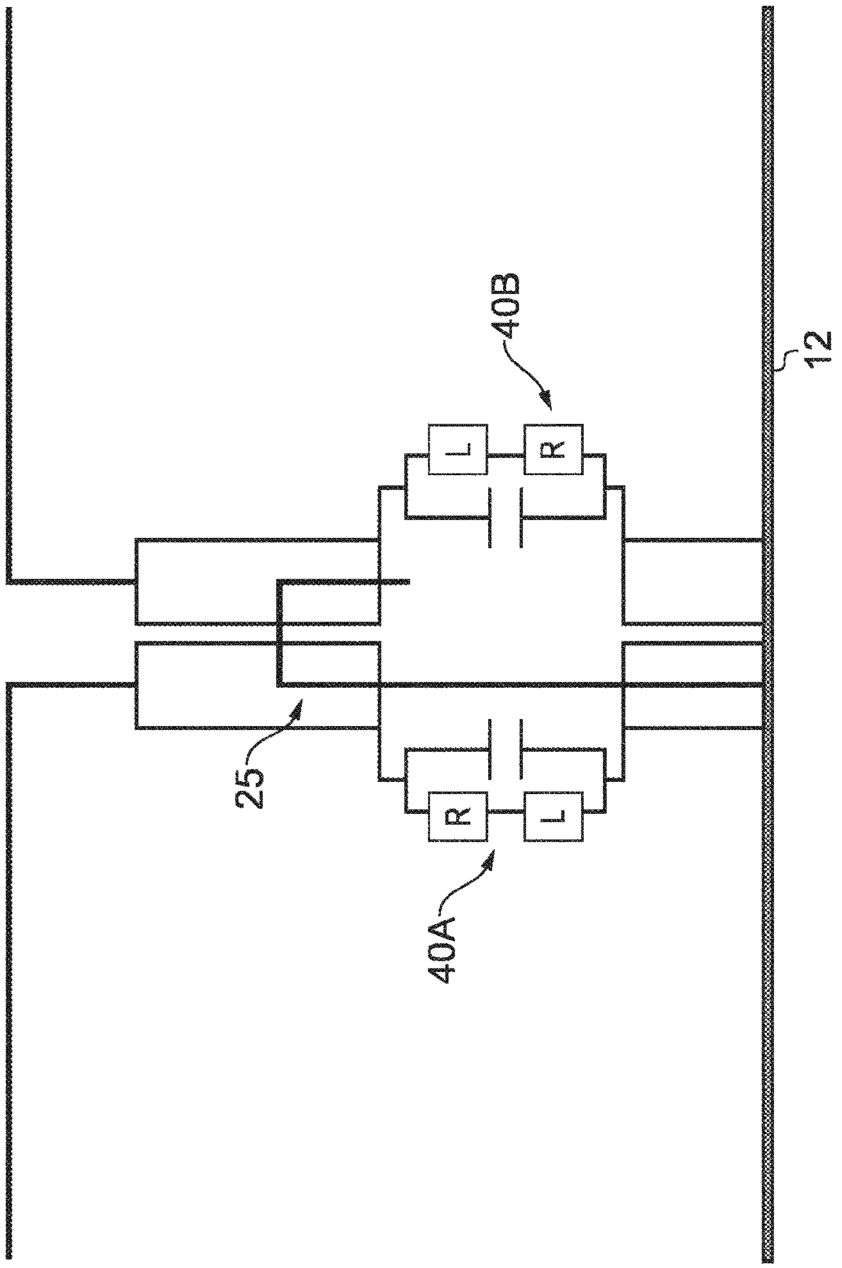
FIGS. 3A, 3B and 3C schematically shows a high band antenna element with the resonance suppression filter incorporated in the balun.
Figure 3B:
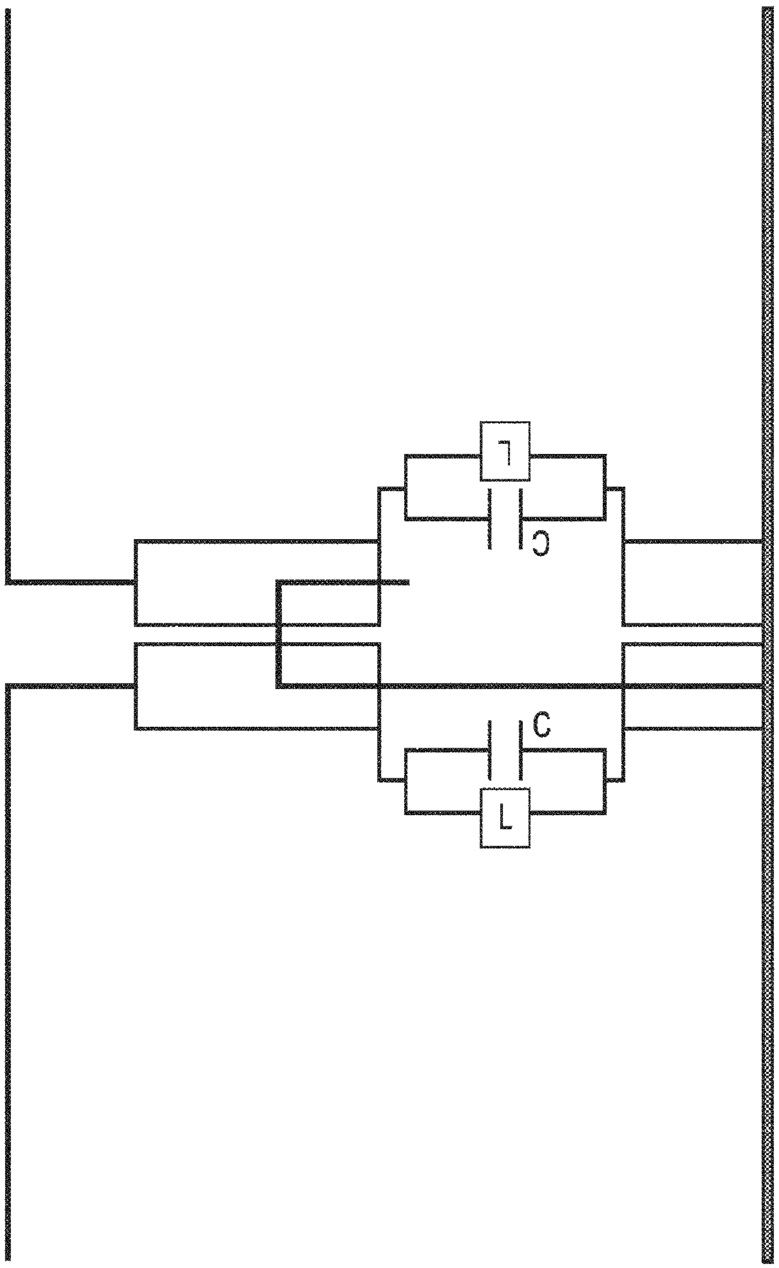
Figure 3C:
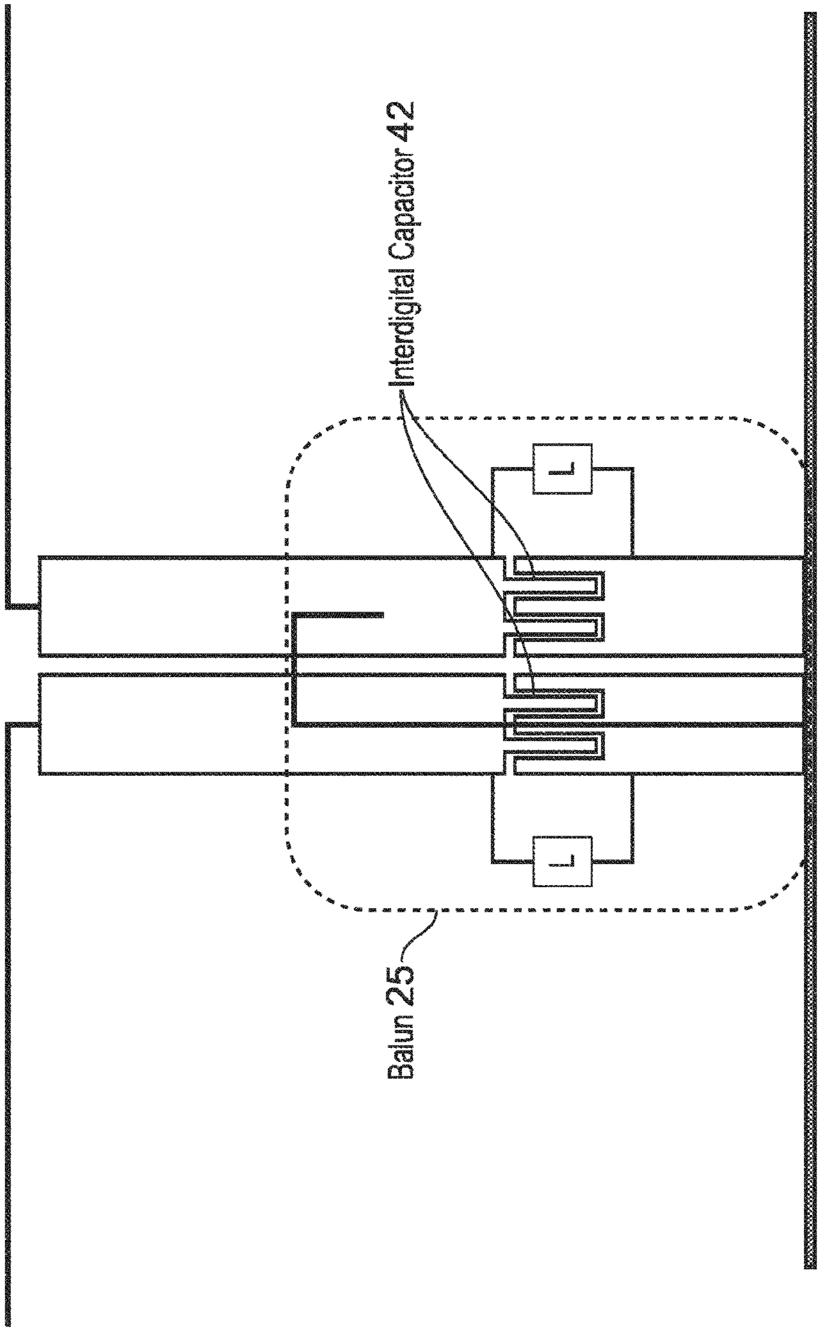

FIG. 3A shows an embodiment where two resonance suppression filters 40A, 40B are part of the balun 25 on the stalk. These two resonance suppression filters break the balanced grounding component on both branches by inserting a capacitor/inductive component into the grounded component of the balanced feed, decoupling the stalk from the ground plane 12 at the lower frequencies and inhibiting the antenna element from resonating at a quarter-wavelength in the lower frequency band of interest. In the embodiment of FIG. 3A the two resonance suppression filters comprise a capacitor arranged in parallel with a resistor and inductor that are in series. FIG. 3B shows an alternative embodiment where the two resonance suppression filters do not have the resistor and are simply an inductor and capacitor arranged in series.

In both of these embodiments by providing the resonance suppression filter 40 on the balun the capacitor is still part of the matching network however, the advantage is that the deleterious effect on matching is slightly less than were the filter to be on the radiating arms or in the balanced transmission line.

In some embodiments the resonance suppression filter is formed within a PCB, and the capacitive element 42 may be formed over a winding length on a single layer of the PCB because the dipole feed track is on the other side. The ground layer for the feed track is broken to insert the capacitor on the balun, which presents a problem for the feed track transmission line, but this can be overcome by careful tuning of the capacitor. This arrangement is shown in FIG. 3C that shows the interdigital capacitor 42 as a track on a single layer of the PCB within the balun 25 portion of the stalk.

In the embodiment of FIG. 3A the resonance suppression filter comprises an inductive and resistive element arranged in parallel with a capacitive element. However, as can be seen from the embodiment of FIG. 3B, the resistive element is optional and may not be present, in other embodiments there may be an additional capacitive element arranged in series with the resistive and inductive elements as is shown in the resonance suppression filters of FIG. 2B.

Figure 4A:
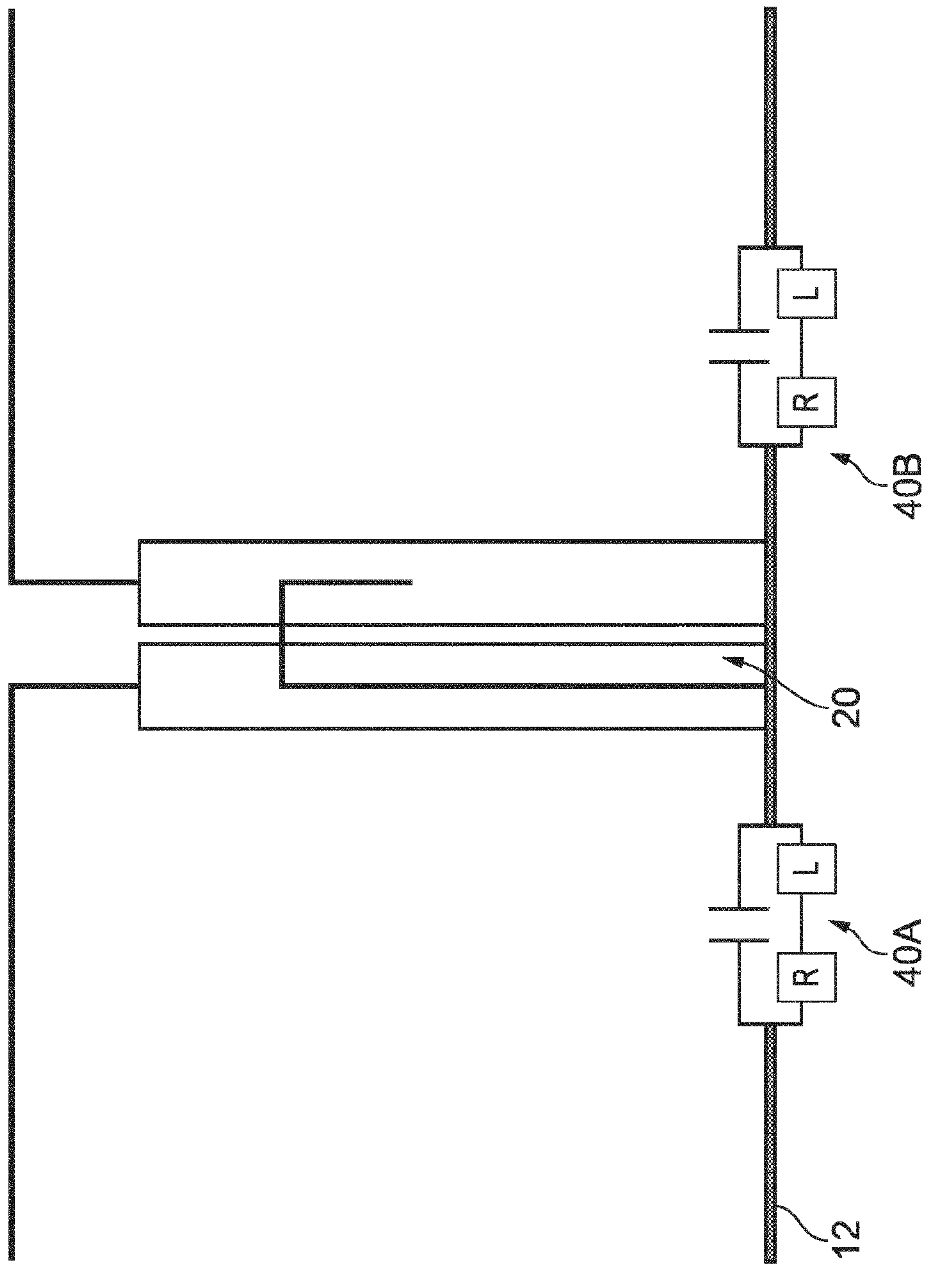
FIGS. 4A and B schematically show a high band radiator element with the resonance suppression filter incorporated in the base board of the antenna element.

FIG. 4A shows an alternative embodiment where the suppression filters 40A, 40B are placed on the baseboard between the stalk 20 and the ground plane 12 on which the stalk 20 is mounted. Again these resonance suppression filters 40A, 40B act to decouple the ground plane 12 from the stalk 20 at the lower frequencies. In effect the resonance suppression filter 40A, 40B acts like a short circuit to the higher frequencies and an open circuit to the lower band frequencies of interest in an ideal state, in effect it acts like a band stop filter in the band of interest. The resonance suppression filter could be viewed as tuning the quarter wave resonator outside of the band of interest.

Figure 4B:
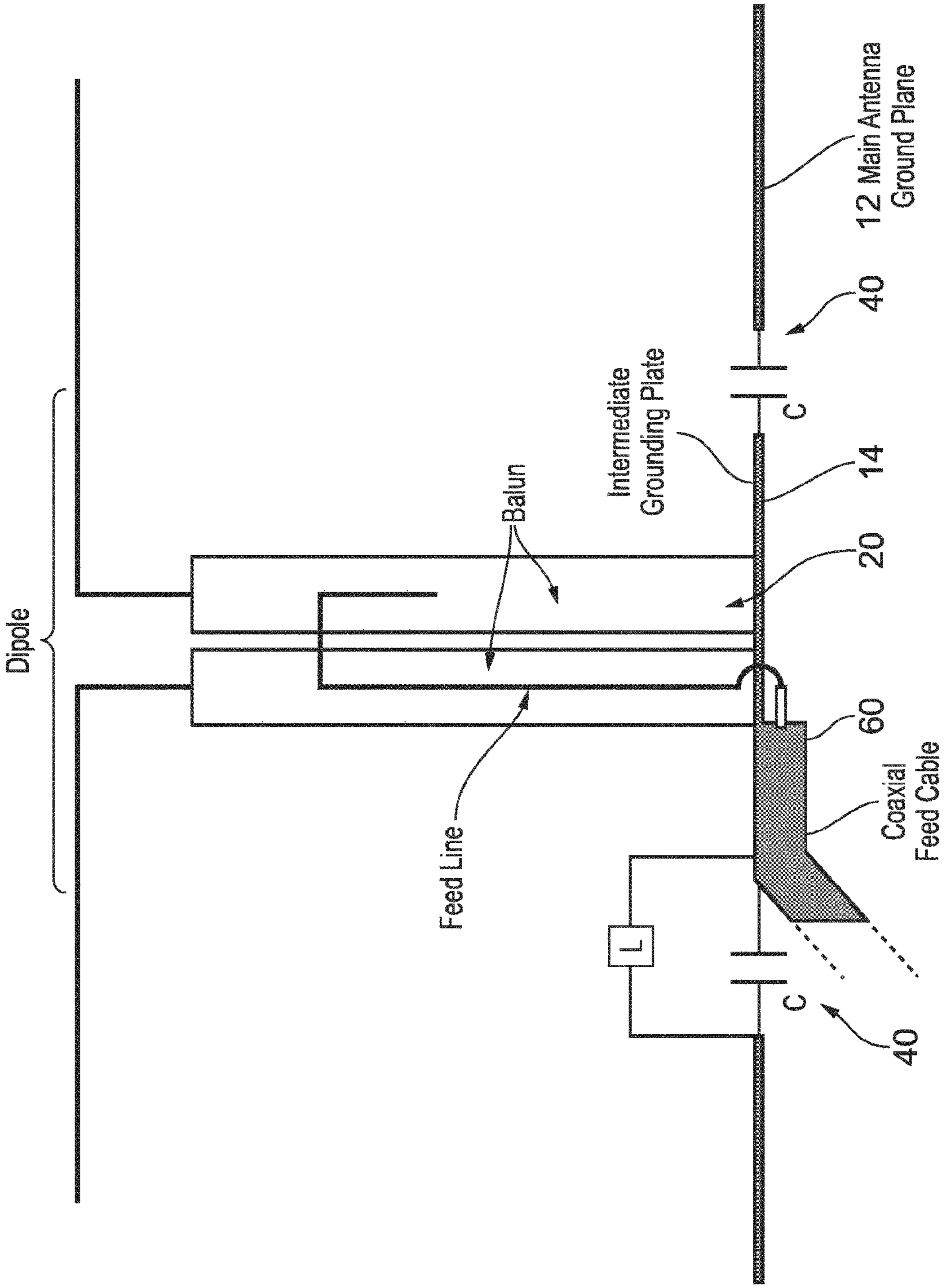
FIG. 4C-4E show a view of different implementations of the resonance suppression filter associated with the baseboard.

FIG. 4B shows a further embodiment where the suppression filter 40 is attached to the baseboard which acts as an intermediate ground plane and lies between the stalk 20 and the ground plane 12. It should be noted that this is a schematic figure and is drawn this way to make it easier to distinguish the features of the design.

FIG. 4B shows a coaxial feed cable 60 arranged with the outer conductor connected to the intermediate ground plane or intermediate grounding plate 14 at the base of the stalk 20. The inner conductor of the feed cable directly connects to the feed line on the balun, which is in turn grounded to the intermediate grounding plate 14. This allows the matching circuit for the high band to be completed at this intermediate grounding plate—a full forward and return path is implemented from cable inner conductor back to the outer conductor. The bandstop common mode resonance CMR filter (parallel LC) is then added between this intermediate plate 14 and the main ground plane 12 of the antenna. The filter therefore has no or very limited effect on the matching of the dipole and we are free to independently set the Land C to optimise the bandwidth of the filter for the low band.

At the high band, the capacitor in the filter acts as a low impedance between the intermediate grounding plate 14 and the main ground plane 12, which is required for proper formation of radiation patterns. The inductor L provides a path for any residual low band signal on the outer conductor to be shunted to the ground plane 12, preventing or at least reducing spurious radiation from the cable.

Figure 4C:
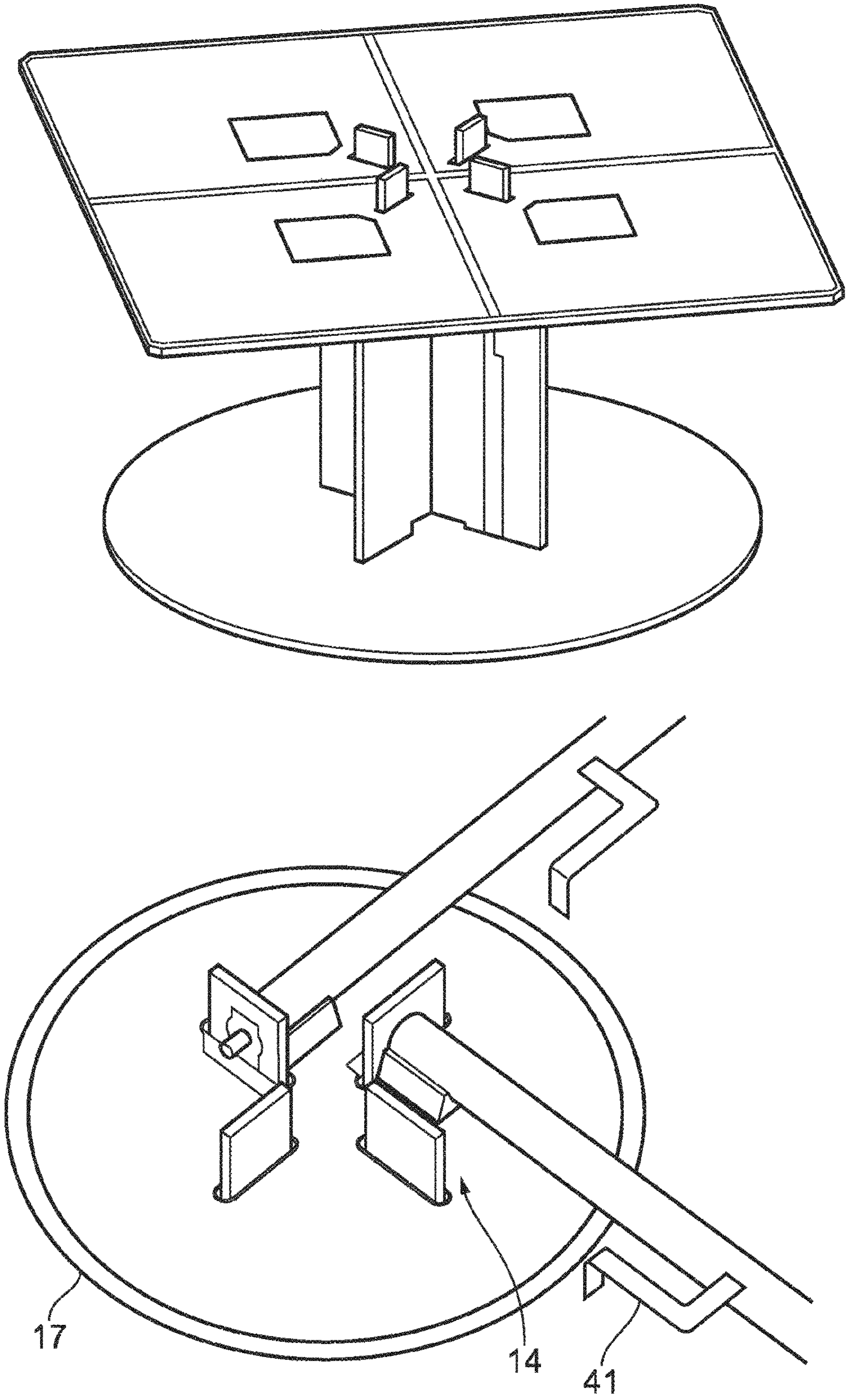

FIG. 4C shows a physical implementation of the embodiment of FIG. 4B with the intermediate grounding plate 14 and the main ground plane 12 on the same copper layer of a PCB, separated by a slot or ring in the copper 17. The capacitance is an edge capacitance across this slot 17 coupling across the gap. The inductance is provided partly by the outer conductor of the cable that bridges the gap and then also a conductive element 41 that connects down to the main ground plane 12. This conductive element 41 can be anything that provides sufficient series inductance that, along with the cable outer conductor, tunes the common-mode resonance out of the lower frequency band of interest.

In this embodiment the conductive element 41 is a metallic strip, but it could be a discrete inductor, length of wire or any other metallic conductor.

In some embodiments the outer conductor of the cable could be used alone and then directly connected to the main ground plane by any technique that provides a low impedance at the low band—direct connection or high-admittance capacitive connection.

In a further embodiment, not shown, an inductive component may be provided directly across the slot and the cable not used for this purpose at all. Challenges with this approach are that the cable is floating from main ground and able to radiate any signal that it picks up off the high band dipole structure. Arranging the cable at the opposite side of the ground plane to the radiating elements helps to address this issue.

Figure 4D:
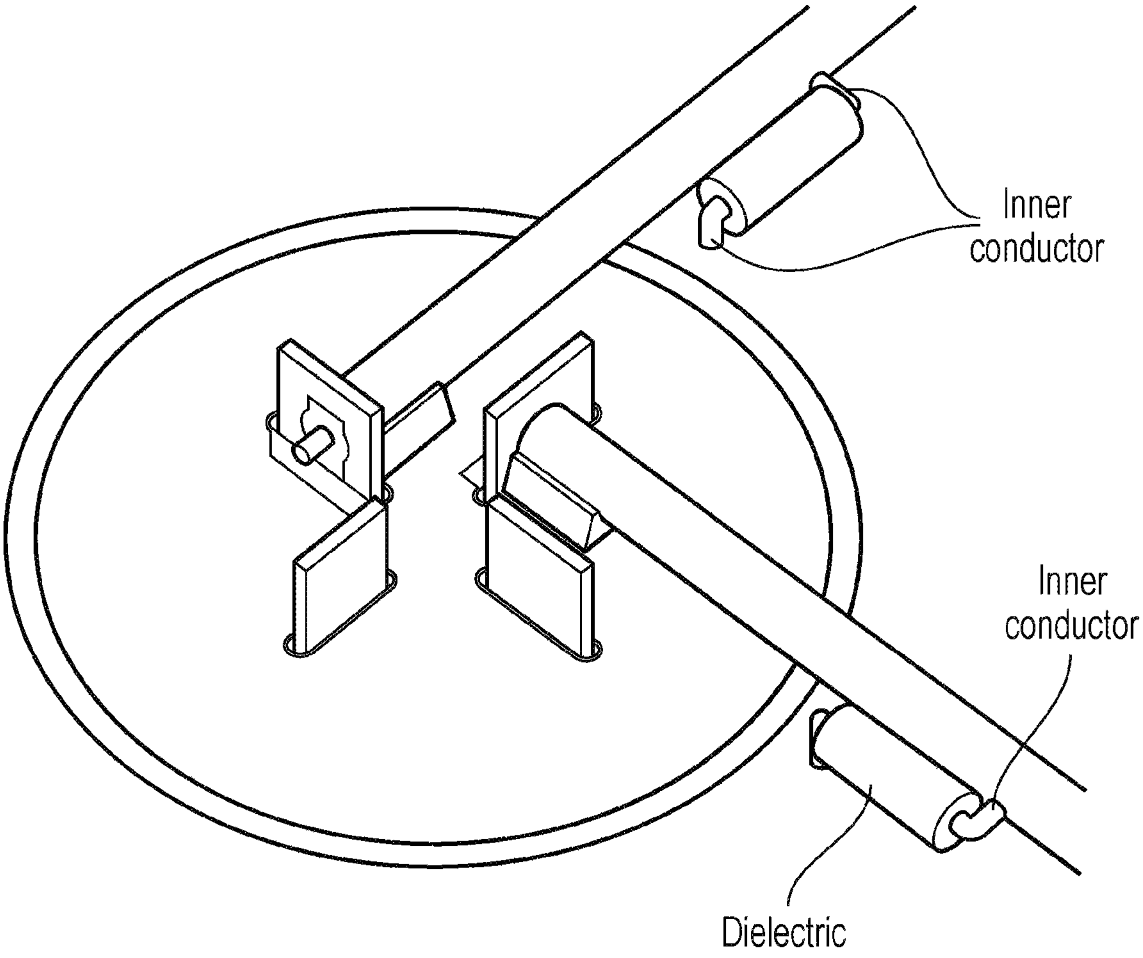
Figure 4E:
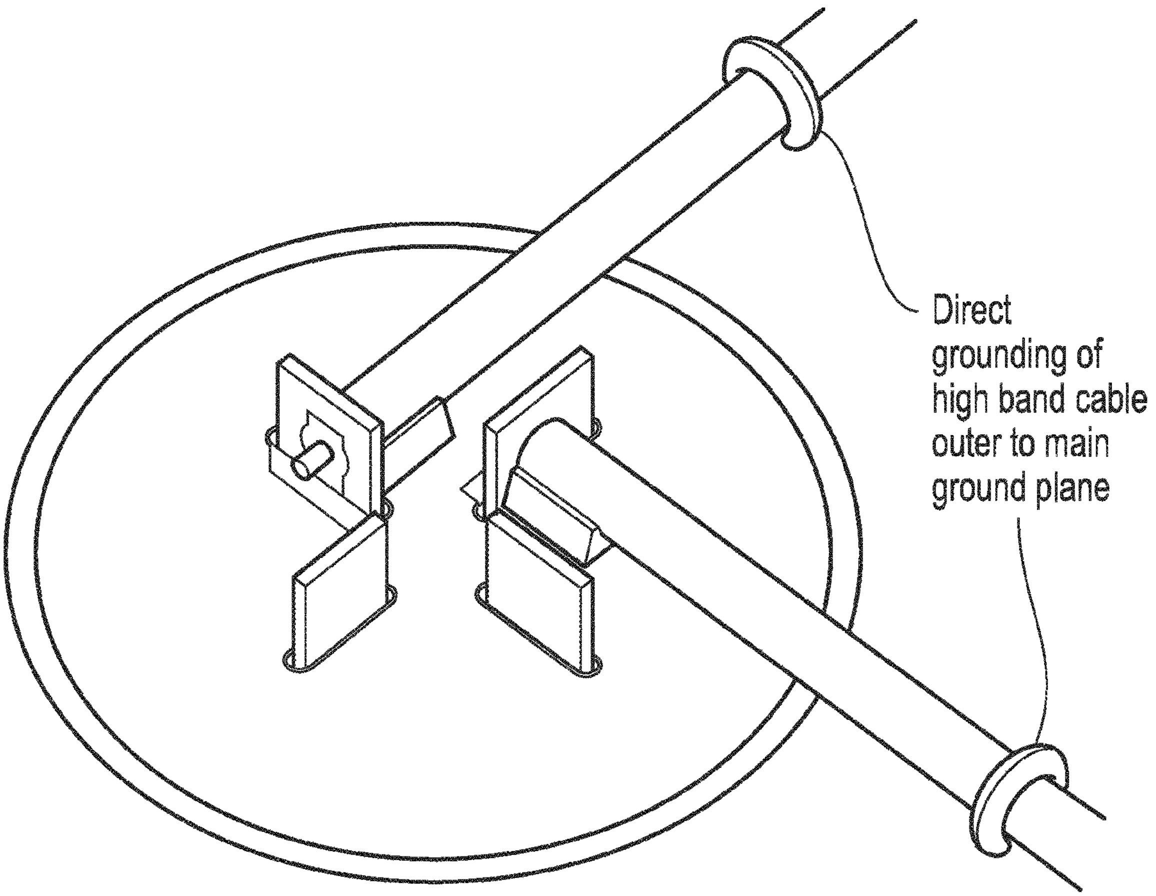

FIG. 4D shows another embodiment where short lengths of coaxial cable are used between the coaxial feed cable and the main ground plane 12. These short lengths of coaxial cable have their outer jacket removed leaving the cable dielectric and inner conductor behind. The inner conductor is the inductive element and the dielectric acts as an insulator between the inner conductor and the cable and ground plane, preventing undesired connection between these elements.

The inductor and capacitor could be implemented in various different ways as would be understood by a skilled person in order to provide the CMR filter between the intermediate grounding plate 14 and main ground plane 12. By providing an intermediate grounding plate the high band feed circuit is independent of the CMR filter, allowing independent control of high band impedance matching and CMR filtering at the low band. In another embodiment FIG. 4E, the inductive strip can be quite short in length (equivalent to direct grounding of the high band feed cable outer conductor to the main antenna ground).

Figure 5A:
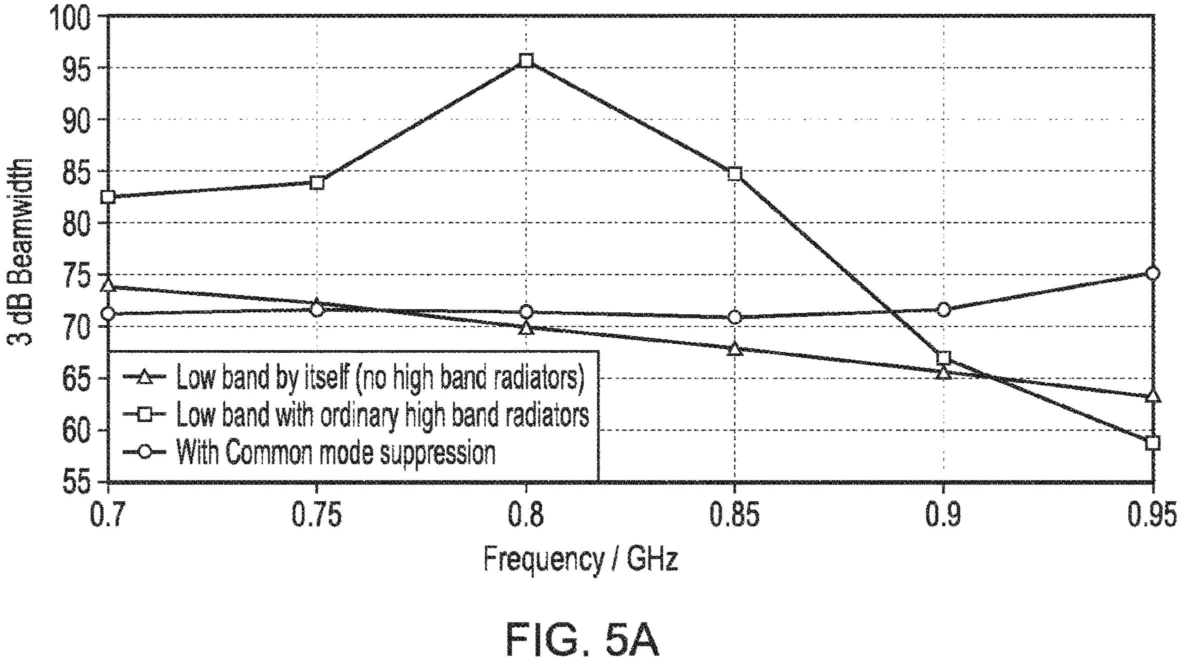
FIGS. 5A and 5B show a comparison of the low band azimuth 3 dB beamwidths for a low band antenna array on its own, surrounded by conventional high band radiators and surrounded by high band radiators according to an embodiment.
Figure 5B:
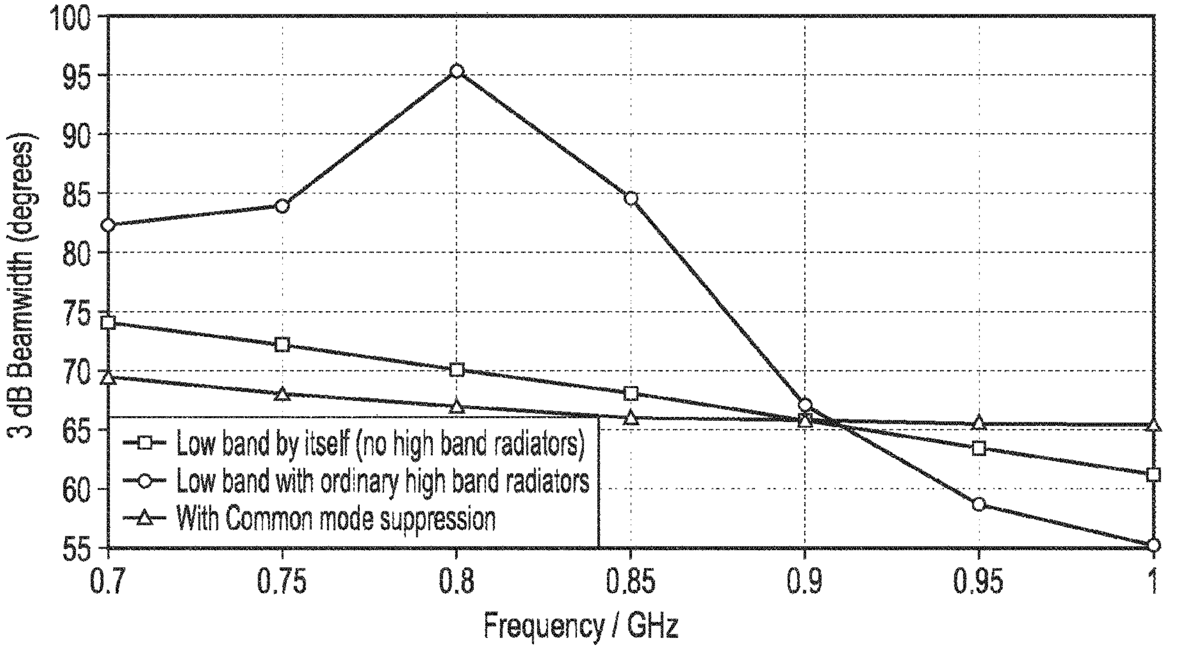

FIGS. 5A and 5B show how the 3 dB beamwidth within the lower frequency band increases at certain frequencies where there are conventional high band radiators in the vicinity to disturb the radiation pattern, and these high band radiators have a natural quarter-wave common-mode resonance in the lower frequency band. FIG. 5B shows the performance for the embodiment of FIG. 4, while FIG. 5A shows the performance of embodiments of FIG. 3. Both plots show how without the high band radiators, the beamwidth is restricted across the entire frequency range of the lower frequency band, while with the high band radiators there are increases in the beamwidth at certain frequencies. When resonance suppression filters according to an embodiment are provided, the beamwidth is again restricted across the desired frequency band despite the presence of the high band radiators. The effect is improved for the embodiments of the antenna of FIG. 4 (see FIG. 5B) as these embodiments allow for greater flexibility in the tuning of the CMR filter as the filter is independent of the signal feed circuit. In this regard FIGS. 5A and B shows a significant increase in the beamwidth of the low band with ordinary high band radiators at 0.8 GHz which is due to the quarter wave resonance of the antenna element and this falls off significantly after this frequency. Embodiments use a CMR filter that moves this quarter wave resonance to a lower frequency and takes the increased beamwidth out of the region of interest and provides a decreased beamwidth at the desired frequencies.

Figure 6:
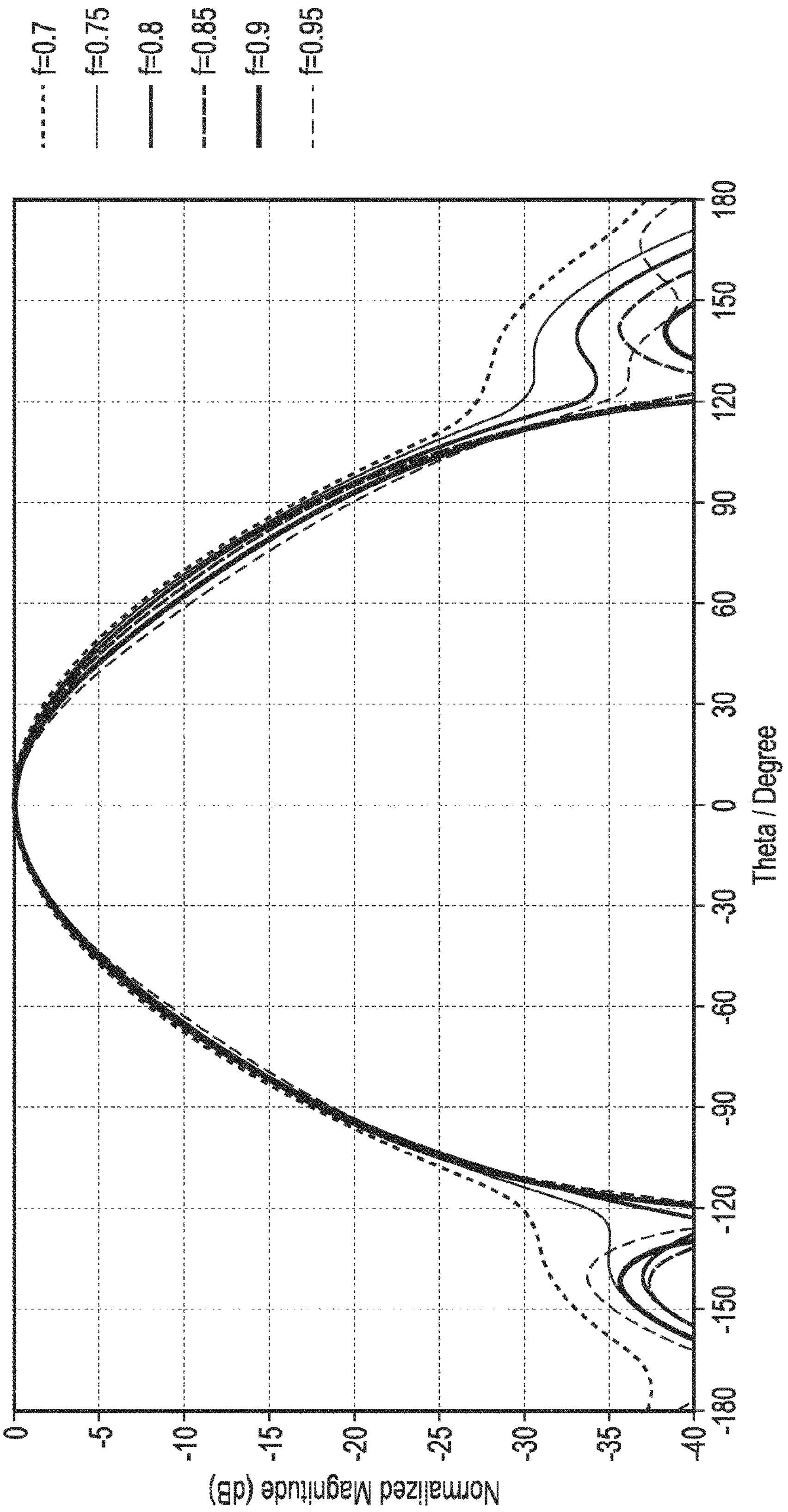
FIG. 6 shows the normalized low band azimuth radiation pattern where there is no high band radiator.
Figure 7:
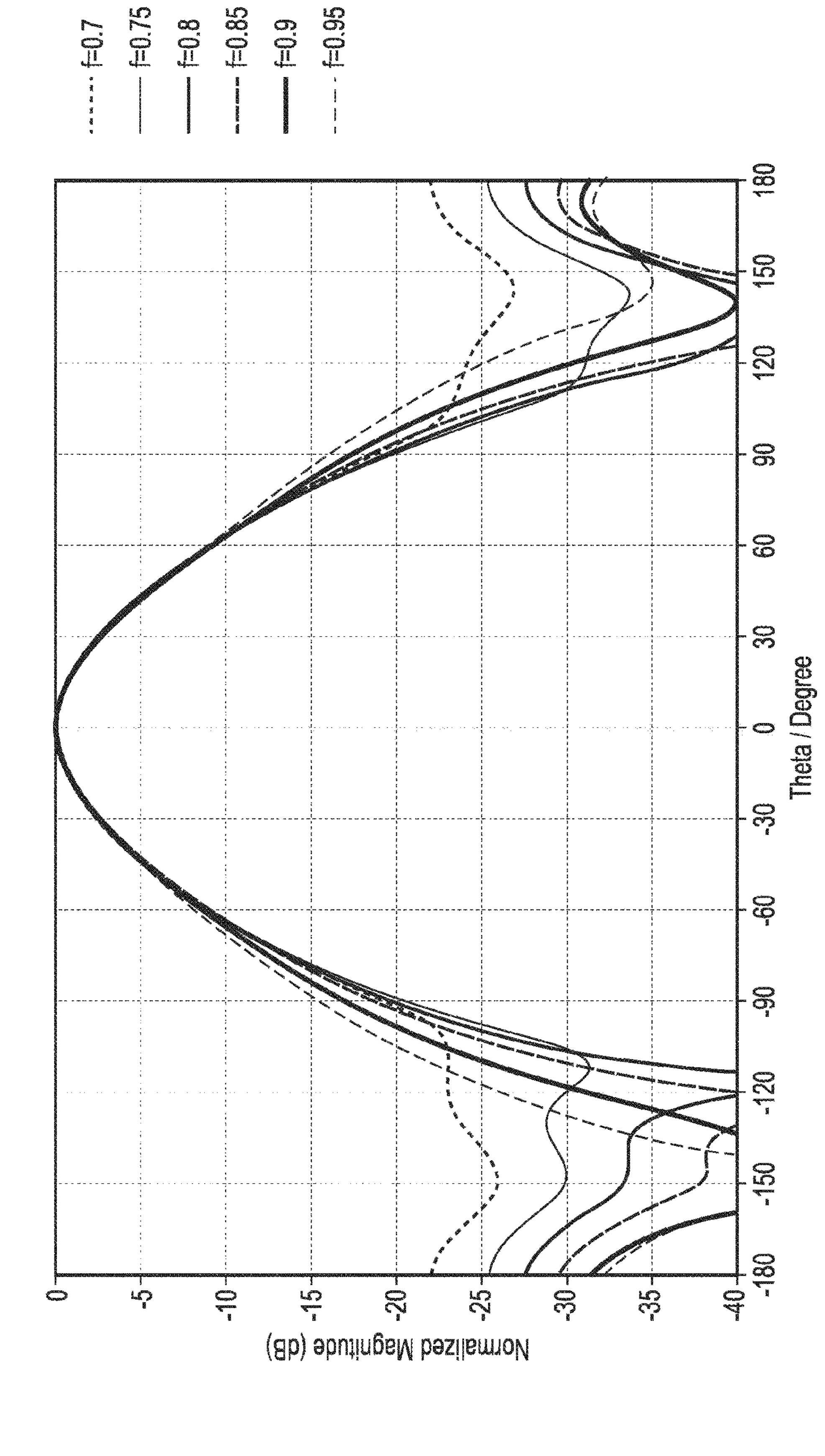
FIG. 7 shows the normalized low band azimuth radiation pattern in the presence of high band radiators according to an embodiment.
Figure 8:
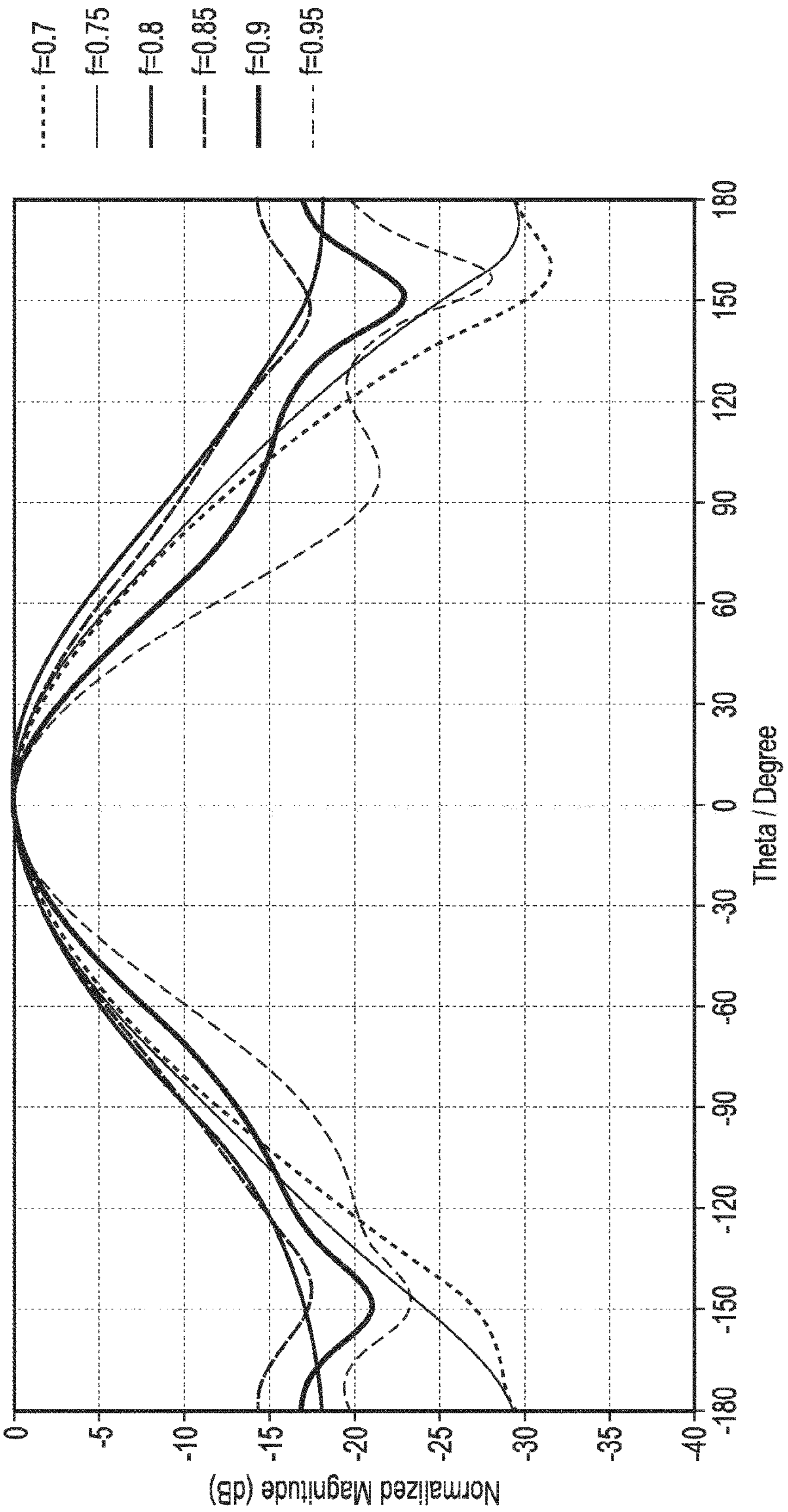
FIG. 8 shows the normalized low band azimuth radiation pattern in the presence of conventional high band radiators.

FIG. 6 shows the low band azimuth pattern in the absence of high band radiators and as can be seen the beamwidth is restricted. FIG. 7 shows how this beamwidth increases slightly in the presence of high band radiators with resonance suppression filters according to the embodiment of FIG. 4, while FIG. 8 shows the much larger increase in beamwidth in the presence of conventional high band radiators lacking resonance suppression filters.

In summary embodiments suppress lower band resonance at the lower frequency band of interest within higher band antenna elements thereby reducing distortion of the lower band radiation pattern and corresponding increase in beamwidth that such resonances may cause.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. An antenna element for a multiband antenna, said multiband antenna configured to operate in at least two frequency bands, said antenna element being configured to resonate in a higher frequency band of said at least two frequency bands, and said antenna element being configured to receive a signal from an unbalanced signal feed, said antenna element comprising:

a stalk mounted on an intermediate ground plane;

at least one radiating element extending from said stalk;

a balun mounted on said stalk and configured to receive and convert an unbalanced signal from an unbalanced signal feed to a balanced signal and to supply said balanced signal to said at least one radiating element; and at least one resonance suppression filter, said at least one resonance suppression filter comprising an inductive component and a capacitive component arranged in parallel, said at least one resonance suppression filter being configured to suppress signals in a frequency band that is lower than said higher frequency band, wherein said at least one resonance suppression filter is positioned to decouple said stalk from a ground plane at frequencies within said lower frequency band, said at least one resonance suppression filter being mounted such that said intermediate ground plane is coupled to said ground plane at the higher frequency band and is decoupled from said ground plane at the lower frequency band.

2. The antenna element according to claim 1, said intermediate ground plane comprising a baseboard.

3. The antenna element according to claim 1, wherein said resonance suppression filter is positioned between said intermediate ground plane and said ground plane.

4. The antenna element according to claim 1, said antenna element comprises a high band signal circuit comprising a high band signal feed element, said balun and a balanced signal feed, said resonance suppression filter being outside of said high band signal circuit.

5. The antenna element according to claim 4, wherein said high band signal feed element comprises a coaxial cable, an outer conductor of said coaxial cable connecting to said intermediate ground plane.

6. The antenna element according to claim 5, wherein said outer conductor of said coaxial cable forms at least a portion of said inductive component of said resonance suppression filter.

7. The antenna element according to claim 5, wherein said coaxial cable is configured to lie on an opposite side of said ground plane and intermediate ground plane to said stalk, such that said coaxial cable is shielded from said at least one radiating element.

8. The antenna element according to claim 1, wherein said capacitive component of said resonance suppression filter comprises a gap between said intermediate ground plane and said ground plane.

9. The antenna element according to claim 1; wherein said balun comprises:

a feed node configured to receive said unbalanced feed signal; and a balancing component extending from said feed node to said intermediate ground plane; and said stalk comprises said balun and a balanced signal feed component extending from said feed node to said radiating element.

10. An antenna element for a multiband antenna, said multiband antenna configured to operate in at least two frequency bands, said antenna element being configured to resonate in a higher frequency band of said at least two frequency bands, said antenna element being configured to receive a signal from an unbalanced signal feed, said antenna element comprising:

a stalk configured to be mounted on a ground plane;

at least one radiating element extending from said stalk;

a balun configured to receive and convert an unbalanced signal from said unbalanced signal feed to a balanced signal feed and to supply said balanced signal to said at least one radiating element; and at least one resonance suppression filter, said at least one resonance suppression filter comprising an inductive component and with a capacitive component arranged in parallel with said inductive component, said at least one resonance suppression filter being configured to suppress signals in a lower frequency band than said higher frequency band, wherein said stalk comprises said balun and said at least one resonance suppression filter is within said balun.

11. The antenna element according to claim 10, wherein said at least one resonance suppression filter is positioned to provide decoupling of said stalk from said ground plane at frequencies within said lower frequency band.

12. The antenna element according to claim 10, wherein said stalk comprises said balun and said balanced feed component, said balun and said balanced feed component being formed on different layers of a printed circuit board.

13. The antenna element according to claim 12, wherein said capacitive component of said at least one resonance suppression filter is formed within said balun on one layer of said printed circuit board.

14. The antenna element according to claim 10; wherein said balun comprises:

a feed node configured to receive said unbalanced feed signal; and a balancing component extending from said feed node to said ground plane; and said stalk comprises said balun and:

a balanced signal feed component extending from said feed point node to said radiating element arm.

15. The antenna element according to claim 10, wherein said at least one resonance suppression filter is configured to suppress signals at a common mode resonant frequency of said antenna element.

16. A multiband antenna configured to operate in at least two frequency bands, said multiband antenna comprising:

a plurality of antenna elements configured to operate in a lower frequency band of said at least two frequency bands; and a further plurality of antenna elements according to any one of claims 1 to 15;

wherein said at least one resonance suppression filter is configured to suppress signals in said lower frequency band.

17. The multiband antenna according to claim 16, wherein a common mode of said further plurality of antenna elements is within said lower frequency band, said at least one resonance suppression filter being configured to suppress signals at said common mode frequency.

18. The antenna element according to claim 2, wherein said resonance suppression filter is positioned between said intermediate ground plane and said ground plane.

19. The antenna element according to claim 6, wherein said coaxial cable is configured to lie on an opposite side of said ground plane and intermediate ground plane to said stalk, such that said coaxial cable is shielded from said at least one radiating element.

20. The antenna element according to claim 1, wherein said high band signal feed element comprises a coaxial cable, a portion of an outer conductor of said coaxial cable connecting to said intermediate ground plane, and a further portion of said outer conductor of said coaxial cable connecting to said ground plane, said connecting to said ground plane being via a direct connection, an inductor or a high-admittance capacitive connection.

* * * * *